(12) United States Patent
Tanner

(10) Patent No.: US 12,030,574 B2
(45) Date of Patent: Jul. 9, 2024

(54) SPACERAIL SYSTEM

(71) Applicant: STASHED PRODUCTS LTD, Montgomery (GB)

(72) Inventor: Elliot James Tanner, Montgomery (GB)

(73) Assignee: STASHED PRODUCTS LTD, Powys (GB)

( * ) Notice: Subject to any disclaimer, the term of this patent is extended or adjusted under 35 U.S.C. 154(b) by 76 days.

(21) Appl. No.: 17/970,520

(22) Filed: Oct. 20, 2022

(65) Prior Publication Data

US 2024/0132172 A1  Apr. 25, 2024

(51) Int. Cl.
*B62H 3/12* (2006.01)

(52) U.S. Cl.
CPC ..................... *B62H 3/12* (2013.01)

(58) Field of Classification Search
CPC ... B62H 3/00; B62H 3/02; B62H 3/04; B62H 3/08; B62H 3/10; B62H 3/12; B66C 7/00; B66C 7/02; B66C 7/04
USPC ..................................... 211/17–24
See application file for complete search history.

(56) References Cited

U.S. PATENT DOCUMENTS

| | | | | |
|---|---|---|---|---|
| 624,231 | A * | 5/1899 | Martin | B62H 3/12 211/162 |
| 3,782,559 | A | 1/1974 | Wright | |
| 5,183,162 | A * | 2/1993 | Ritzenthaler | B62H 3/12 211/121 |
| 5,845,788 | A * | 12/1998 | Robolin | B62H 3/00 211/121 |
| 6,237,781 | B1 * | 5/2001 | Dahl | B62H 3/12 248/320 |
| 6,637,602 | B2 * | 10/2003 | Dueck | A47F 7/00 211/17 |
| 7,165,684 | B2 * | 1/2007 | Ferron | B62H 3/12 211/118 |
| 7,604,131 | B1 | 10/2009 | Clark et al. | |

(Continued)

FOREIGN PATENT DOCUMENTS

| | | |
|---|---|---|
| CH | 701 788 | 3/2011 |
| CH | 706 067 | 7/2013 |

(Continued)

*Primary Examiner* — Patrick D Hawn
(74) *Attorney, Agent, or Firm* — NIXON & VANDERHYE

(57) ABSTRACT

A system for storing bicycles includes an elongate supporting member and carriages. Each carriage has a body supported on and that can travel along the supporting member and a carrier component that extends downwardly from the body, suspending a bicycle. The carrier component rotates with respect to the body about an approximately vertical carrier axis. The carrying component moves vertically between a lower free position and an upper braking position. In the free position, the carrying component can rotate about the carrier axis and the body can travel along the supporting member. The braking position inhibits carrier rotation or body travel. Each carriage has a spring urging the carrying component towards the braking position, and against which the carrying component can be displaced to the free position by weight on the carrying component. The connection between the carrying component and the body allows tilting of the carrier axis.

18 Claims, 14 Drawing Sheets

(56) References Cited

U.S. PATENT DOCUMENTS

| | | | |
|---|---|---|---|
| 8,468,745 B2* | 6/2013 | Krause | B62H 3/00 |
| | | | 248/323 |
| 8,827,363 B2* | 9/2014 | Lagier | B61B 12/002 |
| | | | 211/17 |
| 9,988,118 B1 | 6/2018 | Hall et al. | |
| 10,384,735 B2* | 8/2019 | Clark | B62H 3/12 |
| 10,864,923 B2* | 12/2020 | Deason | B62H 3/08 |
| 11,242,100 B2* | 2/2022 | Ozarski | B62H 3/02 |
| 11,654,989 B2* | 5/2023 | Hall | F16M 13/027 |
| | | | 248/542 |
| 2004/0226899 A1 | 11/2004 | Ferron | |
| 2019/0210675 A1 | 7/2019 | Clark | |

FOREIGN PATENT DOCUMENTS

| | | | | |
|---|---|---|---|---|
| CH | 713486 A2 * | 8/2018 | ............... | B62H 3/12 |
| DE | 20005797 U1 * | 8/2000 | ............... | B62H 3/12 |
| DE | 20208312 U1 * | 2/2003 | ............... | B62H 3/00 |
| DE | 20 2006 015 720 | 1/2007 | | |
| DE | 202015100203 U1 * | 3/2015 | ............... | B62H 3/12 |
| EP | 3 050 784 | 8/2016 | | |
| EP | 3 366 554 | 8/2018 | | |
| EP | 4059818 A1 * | 9/2022 | ............... | B62H 3/12 |
| EP | 4079615 A1 * | 10/2022 | ............... | B62H 3/12 |
| FR | 2503654 A1 * | 10/1982 | ............... | B62H 3/12 |
| GB | 2 291 095 | 1/1996 | | |
| JP | 1-73251 | 5/1989 | | |
| JP | 2014-177198 | 9/2014 | | |

* cited by examiner

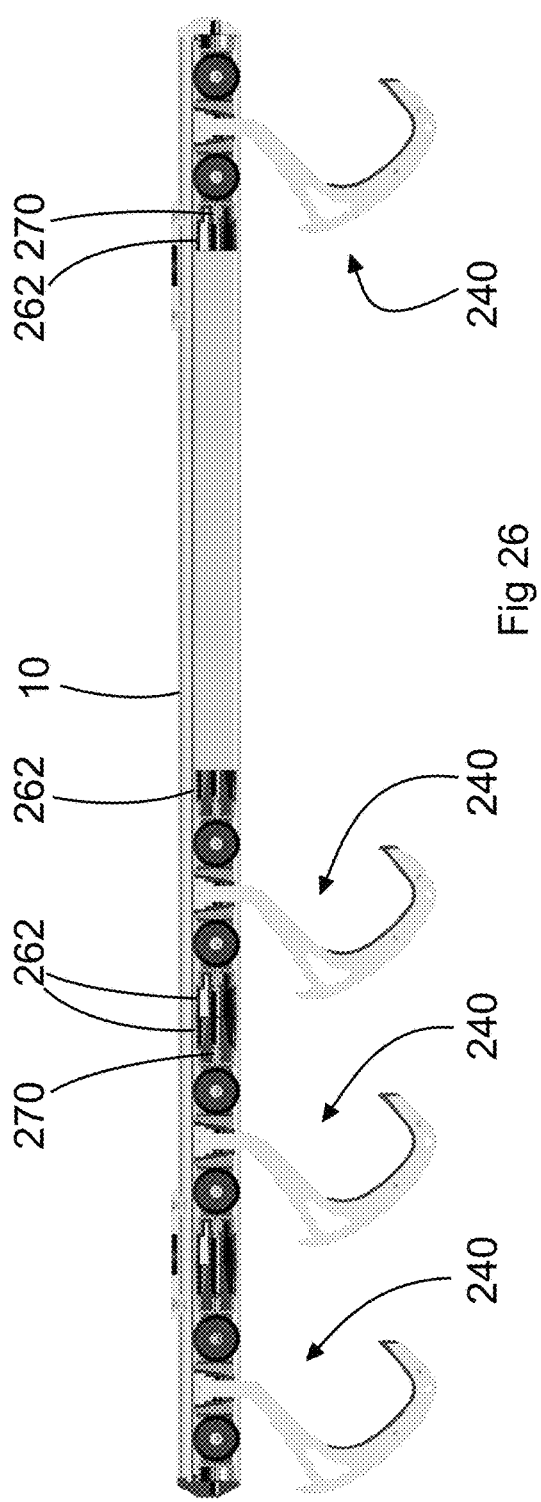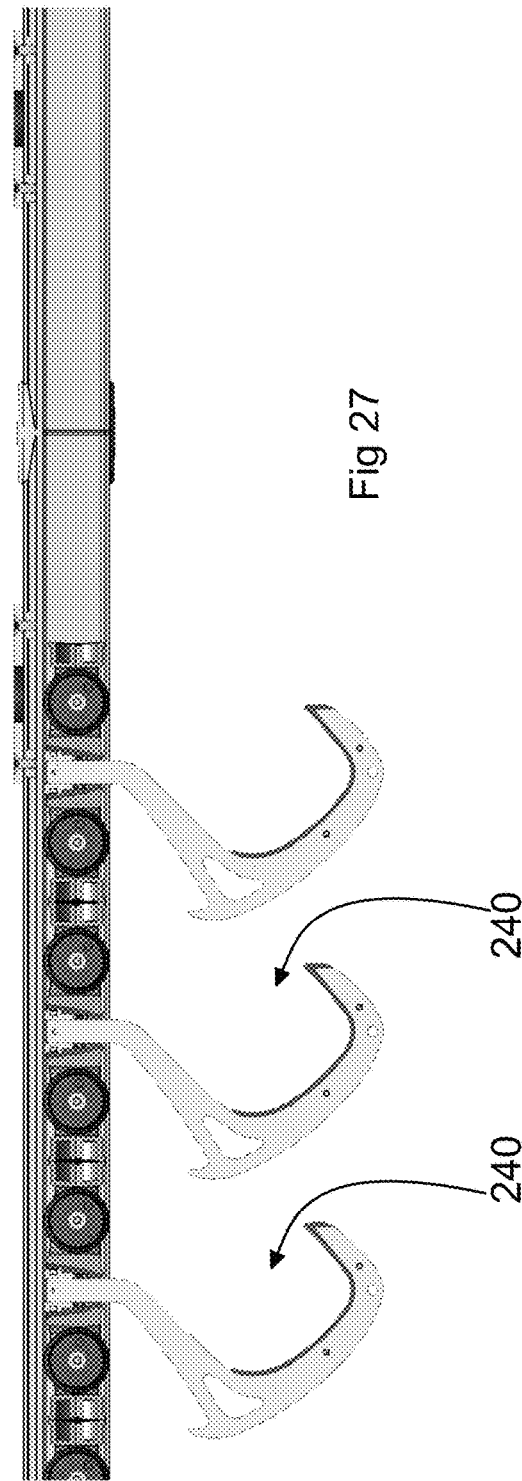

SPACERAIL SYSTEM

BACKGROUND TO THE INVENTION

Field of the Invention

This invention relates to a system for storage of bicycles.

The storage of bicycles when not in use can present their owners with a significant challenge. Each machine takes up a significant amount of space, and they can be damaged, or cause damage, easily through coming into contact with people or objects.

Summary of the Prior Art

Various systems for storage of bicycles in an elevated location have been proposed. At their simplest, these may include one or more hooks fixed to a wall or ceiling. More complex systems allow bicycles stored on them to be moved close to one another and to overlap one another so that they can be arranged in a space-efficient manner. However, this can make these systems difficult to use, since the component to which the bicycle is to be suspended is movable, and can therefore be accidentally moved during an attempt to suspend a bicycle from it. An example of a bicycle storage system is shown in EP-A-3 366 554.

SUMMARY OF THE INVENTION

An aim of this invention is to provide a system for suspended storage of bicycles that is both easy to use and space-efficient.

To this end, the present invention provides a system for the storage of bicycles comprising:
a. an elongate supporting member;
b. a carriage that has:
   i. a body that is supported on and that can travel along the supporting member;
   ii. a carrier (typically a plurality of carriers) component that, for use, extends downwardly from the body, from which carrier component a bicycle to be stored can be suspended, the carrier component being capable of rotation with respect to the body about a carrier axis that is approximately vertical;
c. and wherein:
   i. the carrying component can be displaced vertically with respect to the body between a free position and a braking position, the braking position being above the free position;
   ii. in the free position, the carrying component is free to rotate about the carrier axis and the body is free to travel along the supporting member, and in the braking position, at least one of rotation of the carrier and travel of the body along the supporting member is inhibited; and
   iii. the carriage further includes a biasing component that urges the carrying component towards the braking position, and against which the carrying component can be displaced to the free position by weight suspended from the carrying component.

While nothing is suspended from the carrying component, it is not free to rotate nor is it free to travel along the supporting member. The effect of this is that it is unlikely to be accidentally moved during an attempt to suspend a bicycle from it. However, once a bicycle is suspended, the weight of the bicycle displaces the carrying component to the free position, whereupon the bicycle can be moved to an optimum storage position.

The carrying component may include a hook formation from which a wheel of a bicycle can be suspended. The carrying component typically has a structural metal core upon which one or more polymer moulding is carried, the or each moulding being positioned where the hook formation is most likely to make contact with parts of a bicycle that is to be suspended on it. In alternative embodiments, the carrying component may be solid polymer, solid metal or metal wholly or partly coated with a polymer.

Typically, in the braking position, a component of the carriage is urged against part of the supporting member, to create friction between the carriage and the supporting member.

Connection between the carrying component and the body may advantageously be arranged to allow tilting of the carrier axis. This allows the carrying component to tilt with respect to the body, for example, if a transverse force is applied to it when a bicycle is drawn along or hooked onto the carrying component. Preferably, the carrying component is biased to urge the carrier axis towards a neutral, (vertical in an installed system) position, which is most typically close to vertical.

Typically, the elongate supporting member includes two longitudinal, upward-facing supporting surfaces that are spaced apart by a slot. In such embodiments, the body is supported on the supporting surfaces, and the carrying component projects from the supporting member through the slot.

The body may include one or more rollers which make contact with the supporting surfaces to support the body and to enable it to move freely along the supporting member. For example, the body may include two rollers arranged on respective spaced, parallel axes. In such embodiments, each of the pairs of rollers is most typically carried on both of the supporting surfaces. The or each roller may each include flanges which engage with edges of the supporting surface to maintain the carriage centrally within the supporting member during movement of the carriage.

The carrying component may further include a secondary hanging formation from which additional items can be supported. This can be used to store additional items, such as bags, helmets or items of clothing.

Systems embodying the invention may include one or more spacers, the or each spacer being secured to a carriage to increase the minimum distance that the carrying component of a carriage to which the spacer has been secured can approach the carrying component of an adjacent carriage on the elongate supporting member. The spacers may be added to the carriages during installation of the system to reduce the likelihood of bicycles carried on adjacent carriages damage or otherwise interfere with one another. In such systems, each carriage has zero, one or two spacers secured to it Not all of the carriages need have the same configuration of spacers; individual carriages may be configured differently from one another.

A system embodying the invention may further include a security assembly to which a bicycle carried on the system can be securely connected. For example, the security assembly may include an elongate rail, typically, but not necessarily, a rail separate from that described above. In such embodiments, a bicycle can be secured to the rail by a lockable chain or cable that is passed around the rail and part of a bicycle carried on the system. Alternatively, embodiments of the invention may include a security assembly that includes an elongate rail and a plurality of connectors, each connector including an anchorage that can slide within the rail and a length of chain or cable that can be secured by locking to a part of a bicycle carried on the system. This allows the security connectors to slide as a bicycle slides along the elongate supporting member, without having to disconnect it from the security assembly. The invention also provides such a security assembly separately from a bicycle storage system.

BRIEF DESCRIPTION OF THE DRAWINGS

FIG. 26 is a section through a system using carriages of FIG. 20 installed with spacers; and FIG. 27 is a section through a system using carriages of FIG. 20 installed without spacers.

DETAILED DESCRIPTION OF A PREFERRED EMBODIMENT

An embodiment of the invention will now be described in detail, by way of example, with reference to the accompanying drawings.

With reference to the drawings, a system for the storage of bicycles comprises an elongate support rail 10. The support rail extends horizontally at a height greater than the typical length of a bicycle 30, and more typically, above head-height of an adult.

Figure 1:
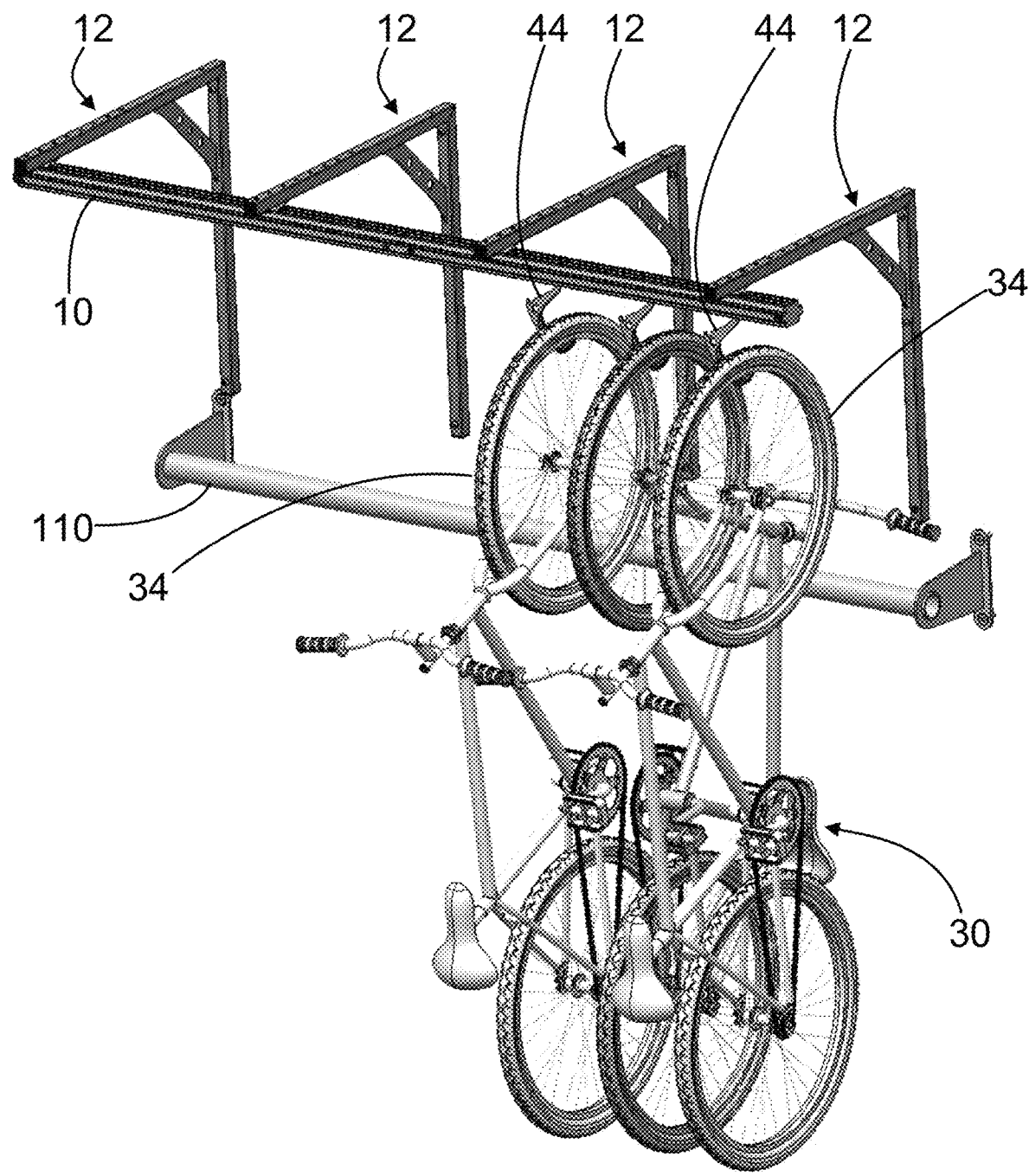
FIGS. 1 and 2 show two embodiments of bicycle storage systems embodying the invention showing bicycles stored in an optimised configuration.
Figure 2:
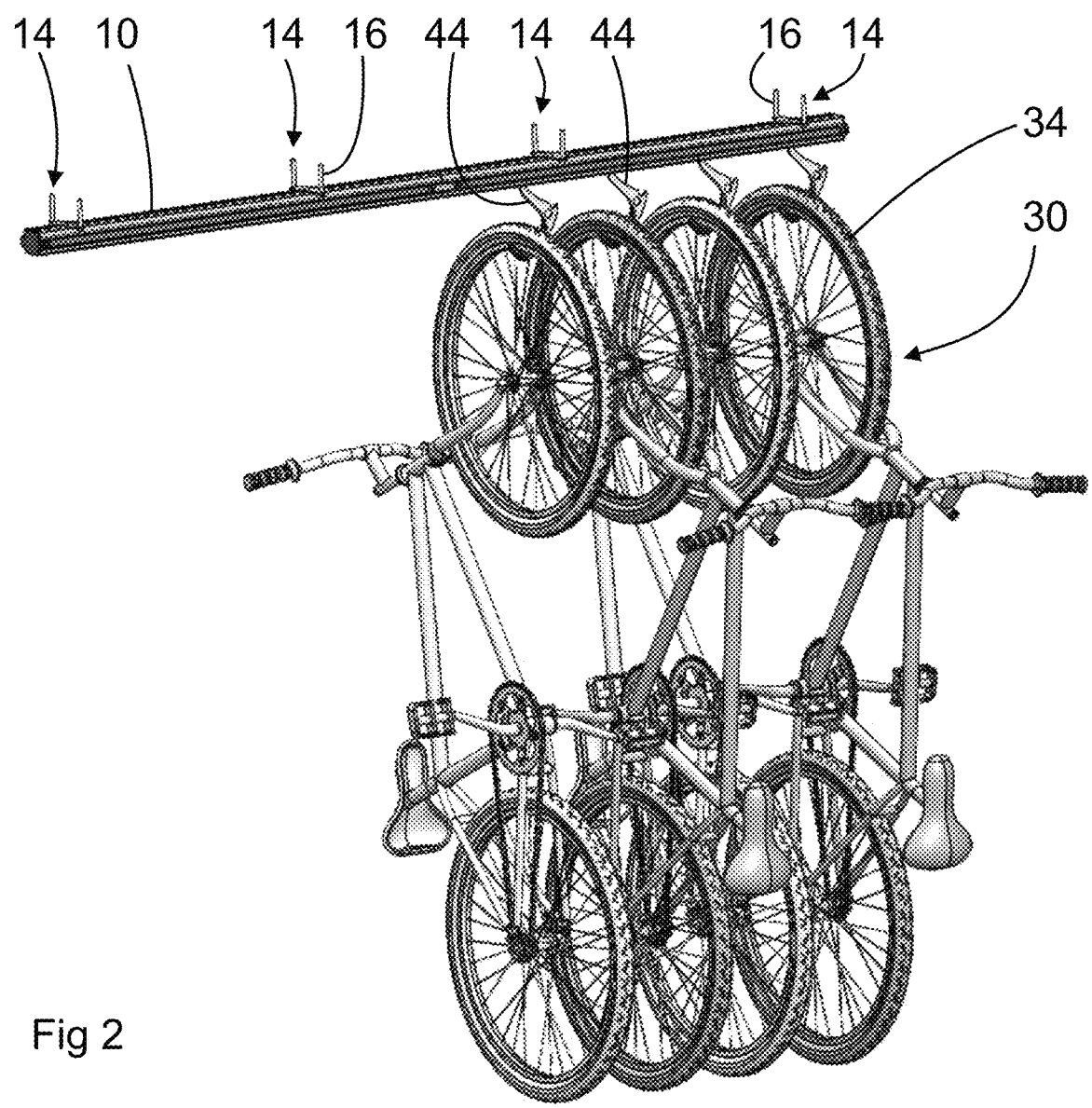
Figure 3:
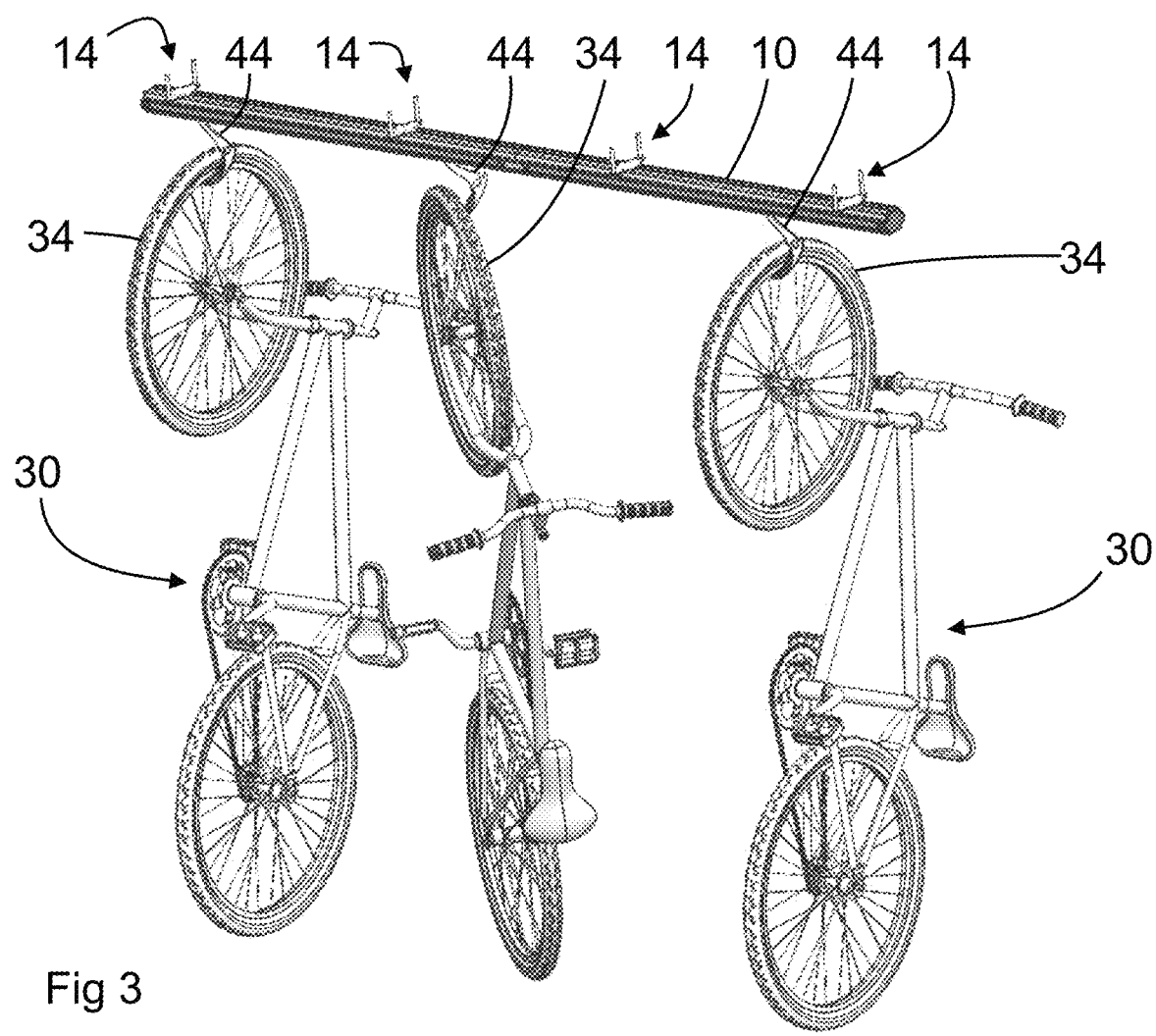
FIG. 3 shows an embodiment of the invention showing bicycles prior to arrangement in an optimised configuration.

In the embodiment of FIG. 1, the support rail 10 is supported from a plurality of wall-mounted brackets 12. In the embodiment of FIGS. 2 and 3, the rail 10 is secured by brackets 14 that are fastened to an overhead structure such as a ceiling, typically by screws 16. The type of bracket used does not affect other aspects of the construction and operation of the system.

Figure 4:
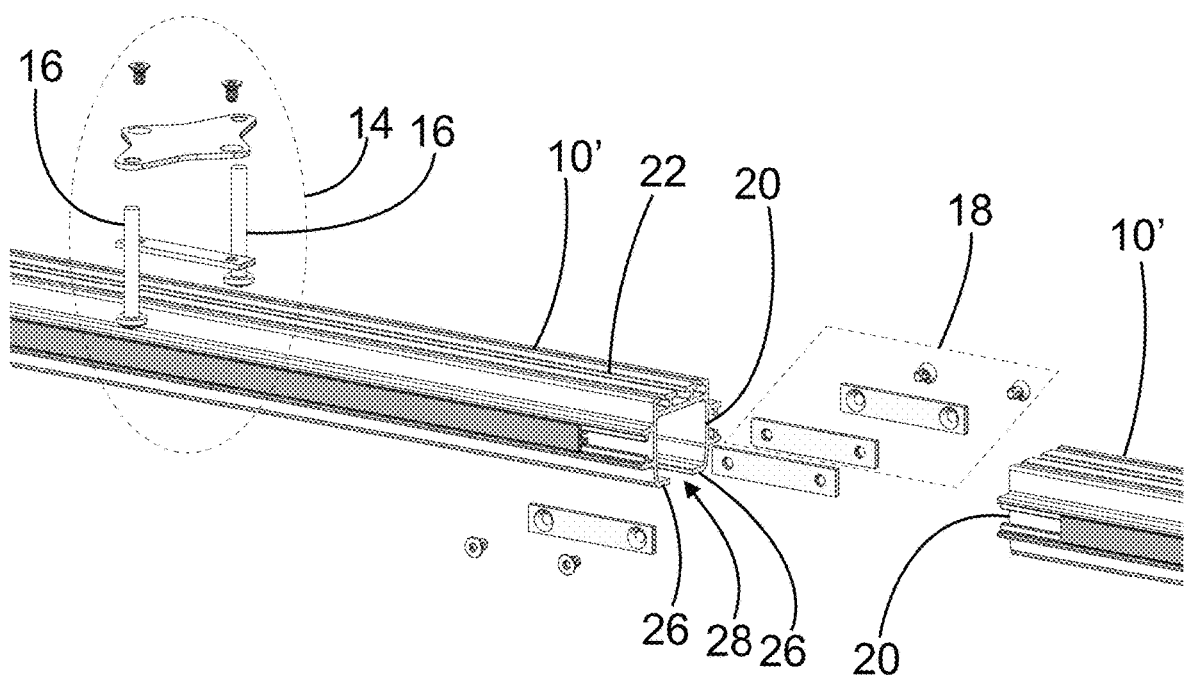
FIG. 4 shows components of an elongate support being part of the systems of FIGS. 1 to 3.
Figure 5:
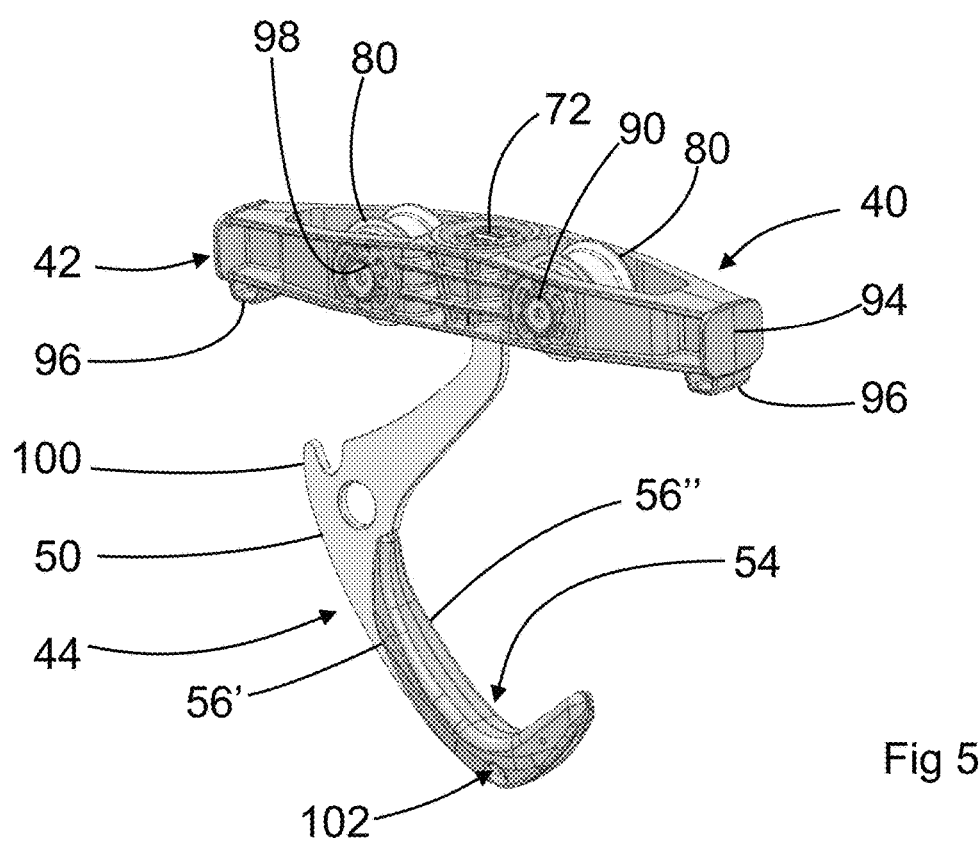
FIGS. 5 and 6 show a carriage being a part of the systems of FIGS. 1 to 3.
Figure 6:
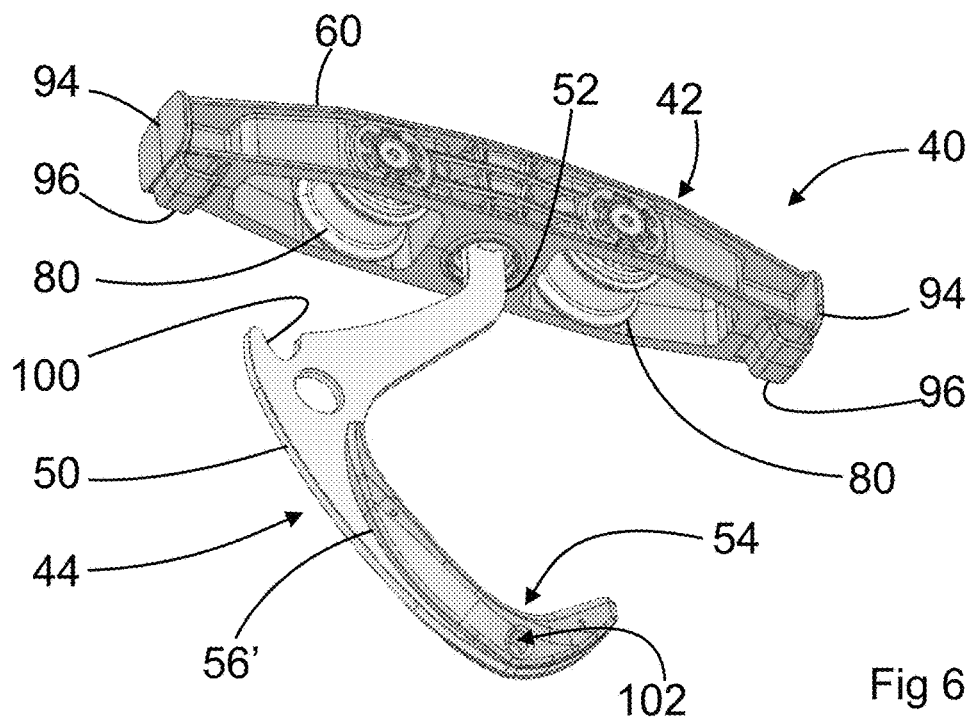
Figure 7:
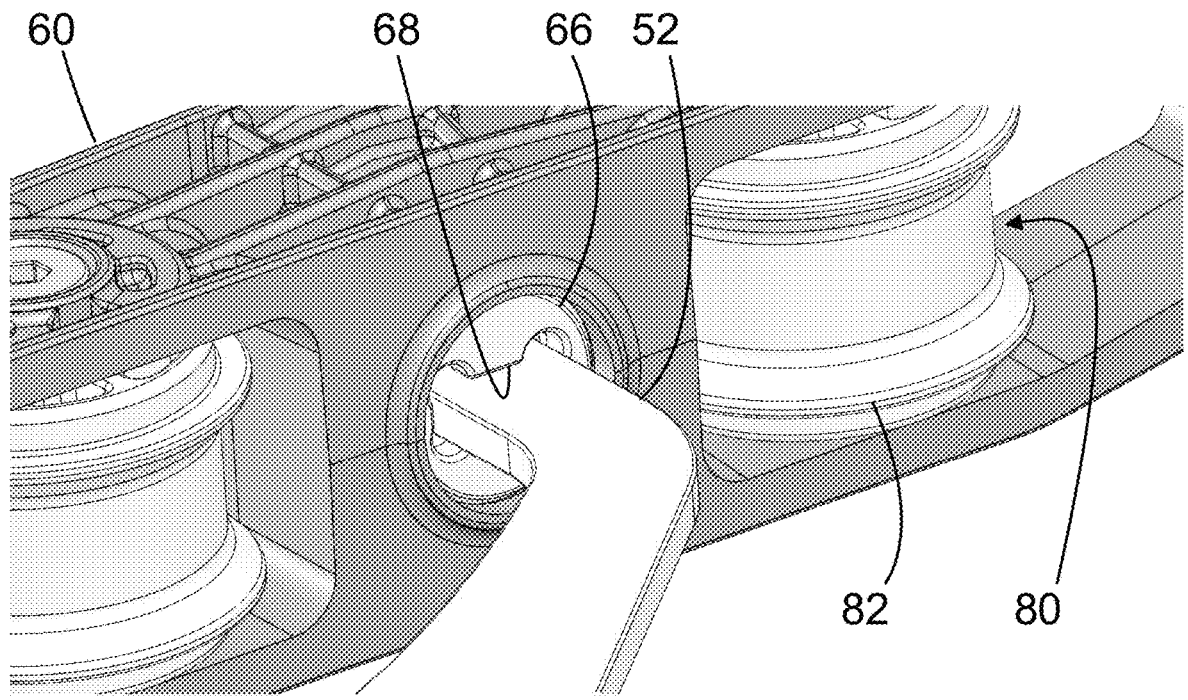
FIG. 7 is a detailed view of the underside of the carriage of FIGS. 5 and 6.
Figure 8:
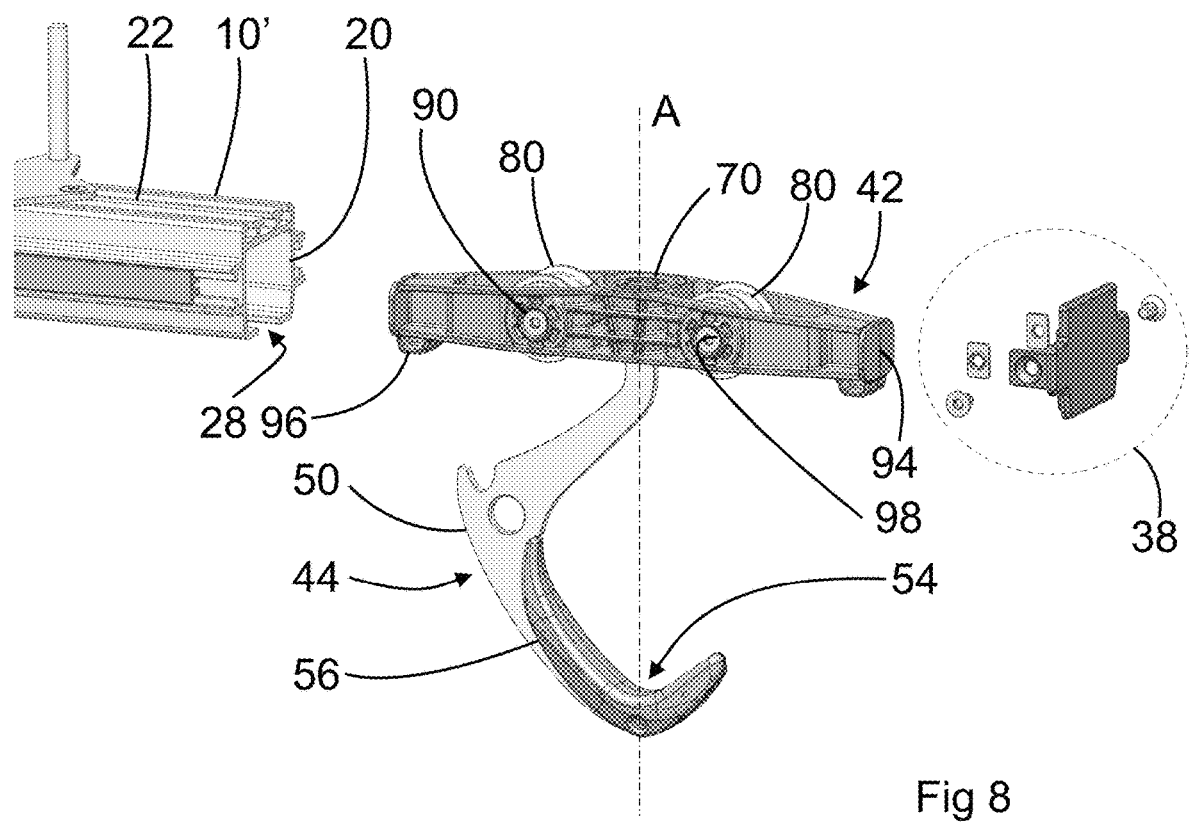
FIG. 8 is an exploded view of a supporting member and carriage being components of embodiments of the invention.
Figure 9:
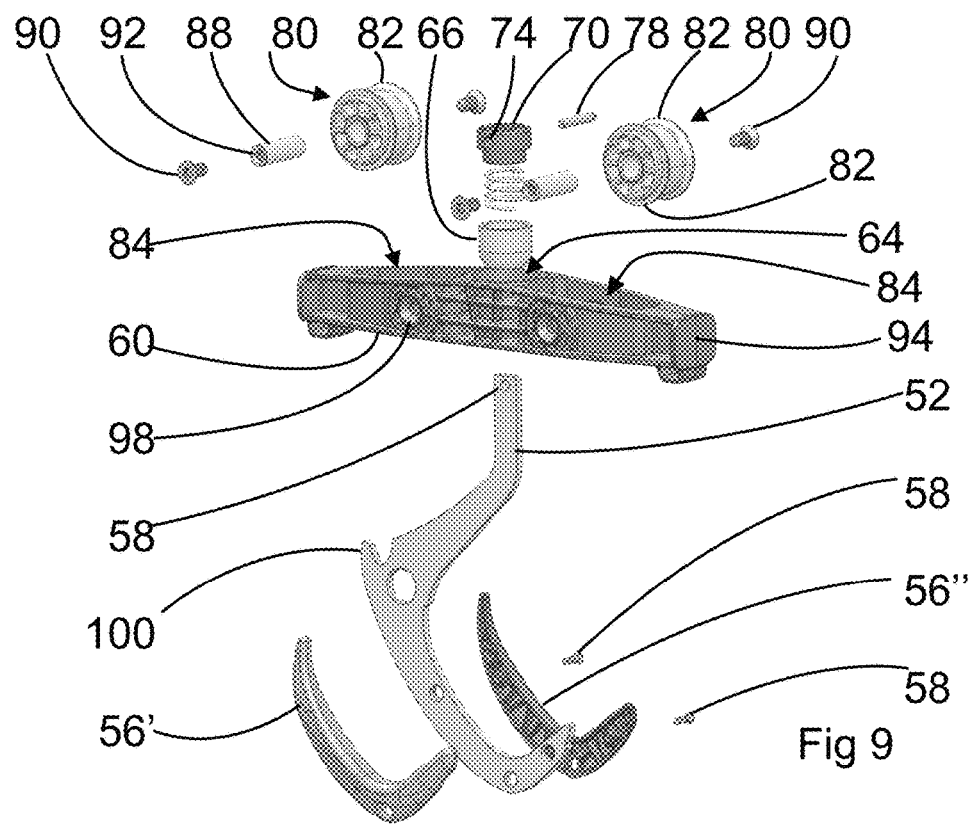
FIG. 9 is an exploded view of a carriage being a component of embodiments of the invention.

The support rail 10 is shown in more detail in FIG. 4. The support rail is formed from a plurality of rail sections 10', each formed as a metal extrusion, and interconnected by coupling plate assemblies 18. The sections 10' are shaped as an inverted U, with side walls 20 which are interconnected by an upper wall 22. Inwardly directed support surfaces 26 extend towards one another from the side walls 20. A slot 28 is defined between the supporting surfaces 26. The side walls 20 and the upper wall 22 have external formations that enable them to be connected to components such as mounting screws 16, components of the coupling plate assemblies and trim components. Each end of the rail 10 is closed by a closure assembly 38 which extends between the side walls 20, the upper wall 22 and the supporting surfaces 26.

The system further includes a plurality of carriages 40. Each carriage 40 comprises a body assembly 42 and a carrying hook 44.

The carrying hook 44 includes a structural core 50 of metal plate. The core 50 has a straight stem portion 52 that extends along a suspension axis A. A C-shaped hook portion 54 extends from the stem portion 52. The hook portion 54 has a tightly curved section through which an extension of the suspension axis A passes. Polymer covers 56', 56" are secured to the core 50 at the hook portion 54 by screws 58 that are passed through one of the covers 56" and the core 50 into the other cover 56'. A through-hole 58 is formed through the stem portion 52 centred on the suspension axis A.

The body assembly 42 includes a body 60 formed as a unitary plastic composite component that is plane-symmetrical and rotationally symmetrical about a central axis, the central axis being coincident with a neutral position of the suspension axis A. The body 60 has a central bore 64 that is centred on the centre axis, the central bore 64 tapering in diameter in a downward direction.

A spring cup 66 is retained within the central bore 64. At a lower end, the spring cup 66 is closed by an end wall, through which a rectangular slot 68 is formed. The spring cup 66 has a circular cross-section of variable diameter, an upper part being cylindrical and a lower part tapering towards the end wall. The diameters of the spring cup 66 and the central bore 64 are such that the spring cup 66 cannot pass through the central bore 64, and such that the tapered part of the spring cup 66 being retained within the tapered part of the central bore 64.

A retaining cap 70 is carried on the spring cup 66. The retaining cap 70 has a stepped outer cylindrical cross-section, with a lower region of lesser diameter which is a close fit within the cylindrical part of the bore of the spring cup 66. The retaining cap 70 has an upper region of greater diameter that is approximately the same diameter as the outer diameter of the cylindrical part of the spring cup 66. A rectangular slot 72 extends axially through a flat upper wall of the retaining cap 70 and a transverse bore 74 extends diametrically through the retaining cap 70 to intersect the slot 72. A compression spring 76 is located within the bore of the spring cup 66, acting between the end wall of the spring cup and the retaining cap 70.

The carrying hook 44 is connected to the carriage 40 by inserting its stem portion 52 through the slot 68 in the spring cup 66 into the slot 72 in the retaining cap 70 until the through-hole 58 in the stem portion 52 aligns with the transverse bore 74 in the retaining cap 70. A pin 78 is inserted into the transverse bore 74 to pass through the through hole 58, whereby the stem portion 52 is retained within the retaining cap 70. The slots 68, 72 in the spring cup 66 and the retaining cap 70 are dimensioned such that the stem portion 52 is a close fit within them, thereby preventing relative rotation of the stem portion 52, the spring cup 60 and retaining cap 70.

The body assembly 42 further includes two rollers 80, each being located within a recess 84 of the body 60. Each roller 80 is cylindrical with two radially-projecting flanges 82 close to but spaced from each axial end surface. A central axle bore extends through each roller 80. The roller 80 is carried for rotation of the roller axle 88. The roller axle 88 is secured within the recess 84 by a pair of screws 90 that extend through countersunk holes 98 in the side walls of the body 60 into tapped holes 92 at each end of the roller axle 88.

At each end, the body has a flat, outwardly-directed end surface 94 that extends transverse to the length of the body 60. Adjacent to each end surface 94, the body has a downward projection 96.

The system is assembled by sliding a leading end surface 94 of the body 60 into the support rail 10 from one of its ends. The adjacent projection 96 enters and is guided by the slot 28 in the support rail 10. The flanges 82 of a lead roller 80 then make contact with sides of the supporting surfaces 26 within the slot 28 of the support rail 10, and the parts of the roller 80 between the flanges 82 and the axial end surfaces are supported on the supporting surfaces 26. As the body 60 continues to slide into the support rail 10, the retaining cap 70 reaches the end of the support rail 10 and makes contact with the upper wall 22. In order to continue, the retaining cap 70 must be displaced into the body 60 against the action of the spring 76 by applying a downward load to the carrying hook 44. The body 60 can then be slid completely into the support rail 10, with the second roller 80 becoming supported by the supporting surfaces 26. Once all of the carriages 40 have been installed in this way, a closure assembly 38 is applied to close the end of the support rail 10 to prevent accidental removal of the carriages 40.

Figure 11:
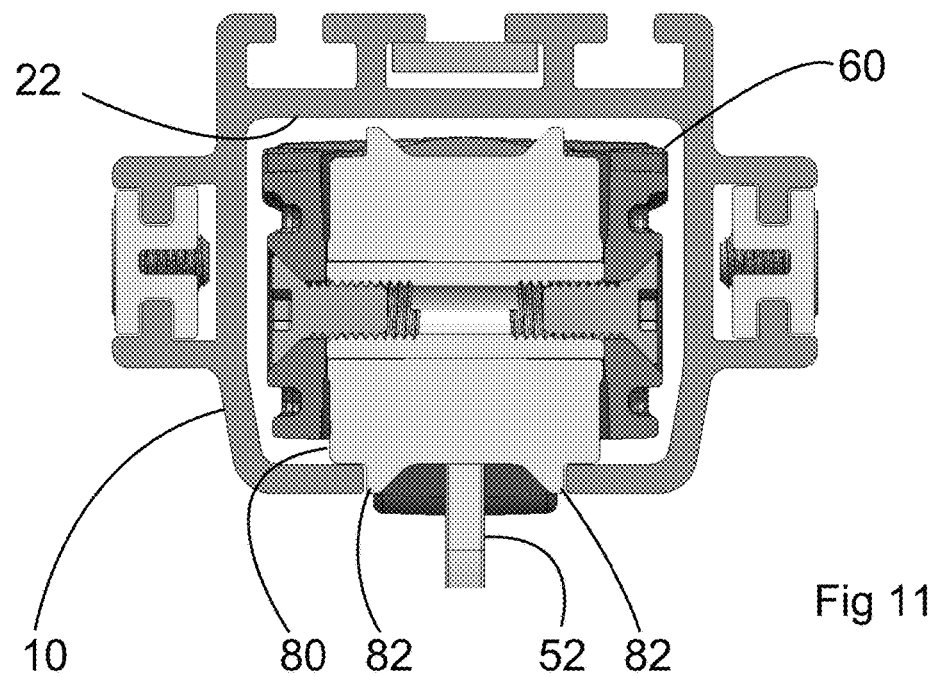
FIG. 11 is a transverse cross-section of the system of FIGS. 1 to 3.

It can be seen from FIG. 11 that, when installed, the flanges 82 of the roller 80 closely approach the upper wall 22 of the support rail 10. This ensures that the rollers 80 have sufficient space in which to travel within the support rail 10, but minimises vertical movement of the carriage 40 with respect to the support rail 10.

Figure 12:
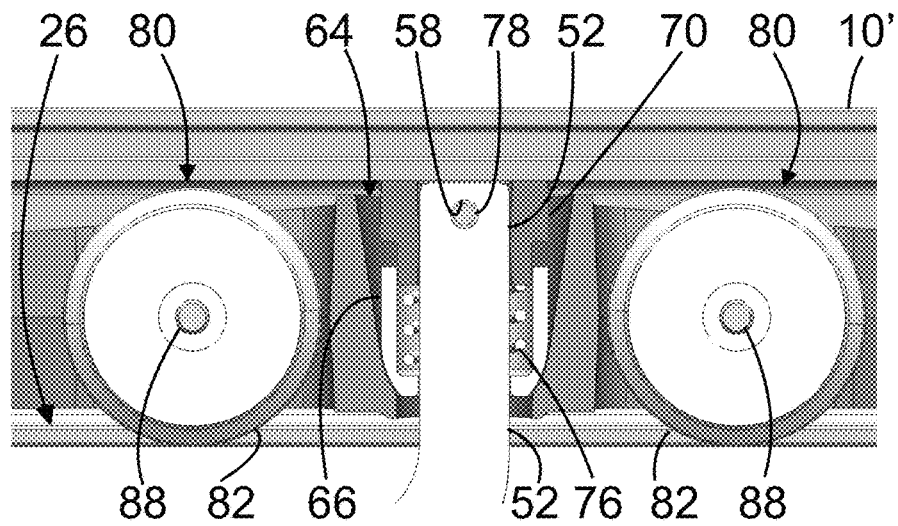
FIG. 12 is a cross-sectional view of the carriage of FIGS. 5 to 8 in an unloaded condition.
Figure 13:
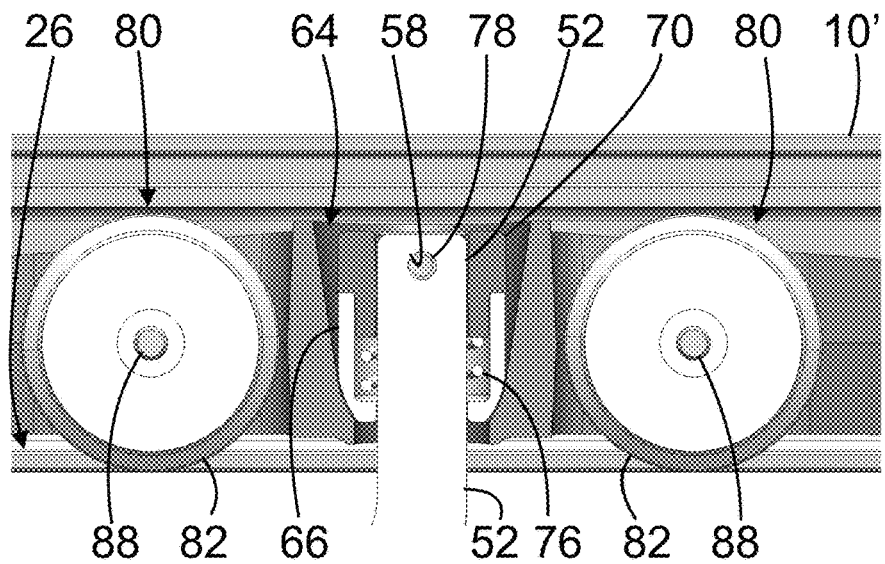
FIG. 13 is a cross-sectional view of the carriage of FIGS. 5 to 8 subject to a vertical load.

When the carrying hook 44 is loaded, the retaining cap 70 is moved downward against the action of the spring 76, as shown in FIG. 13. In this condition, the carriage 40 can slide freely along the support rail 10, carried on the rollers 80, and the carrying hook 44 can rotate with respect to the support rail 10, with the retaining cap 70 rotating with the spring cup 66. When there is no load on the carrying hook 44, the retaining cap 70 is pressed by the spring 76 against the upper wall 22 of the support rail 10, as shown in FIG. 12. Friction between the retaining cap 70 and the upper wall 22 of the support rail 10 inhibits both sliding of the carriage 40 along the support rail 10 and rotation of the retaining cap 70, and therefore the carrying hook 44, with respect to the support rail 10.

Figure 14:
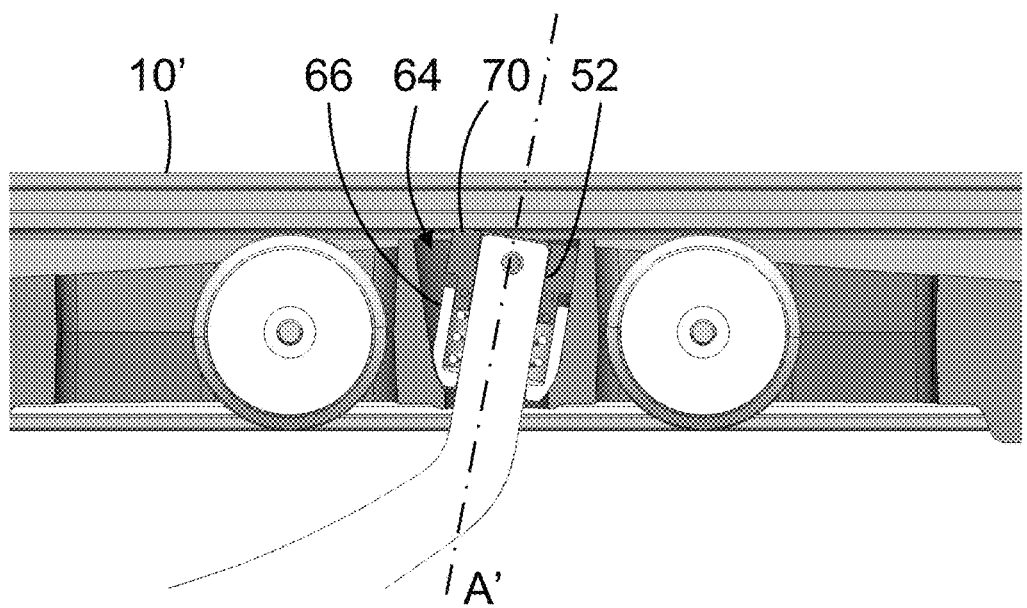
FIG. 14 is a cross-sectional view of the carriage of FIGS. 5 to 8 subject to a load directed along an axis that is displaced from vertical.

When the carrying hook 44 is unloaded, or is loaded but has stopped moving and reached equilibrium with a vertical load acting on it, the suspension axis A will tend to move towards vertical (assuming that the support rail is horizontal). When the carrying hook 44 is loaded, the suspension axis A will tend to coincide with the axis along which the load is applied. When the carrying hook 44 is not loaded, this happens because the flat upper wall of the retaining cap 70 is pressed against the upper wall 22 of the support rail 10, with the result that the flat upper wall of the retaining cap 70 is urged to become coplanar with the upper wall 22 of the support rail. However, if a load that includes more than a minimum threshold transverse component is applied to the carrying hook 44, the retaining cap 70 and the spring cup 66 can twist within the central bore 64 to allow the carrying hook 44 and the supporting axis (indicated at A') to tilt with respect to the carriage body 60 and the support rail 10. This is shown in the carriage towards the right of FIG. 10 and in FIG. 14. (Note that in FIG. 14, the only load applied to the carrying hook is an off-axis load: it is not carrying the weight of a bicycle.) Although these figures show tilt occurring along the length of the support rail 10, it can also occur in a transverse direction or any intermediate direction by the same mechanism. The ability of the loading axis A to tilt minimises the risk of damage to the carriages 40 or the support rail through impact with the carrying hook 44, as might happen when loading or removing a bicycle from the system or when sliding bicycles along the support rail 10. This also allows a bicycle to be tilted outwards or back to allow the bicycles to be interlinked better when they are being put into their final storage position. For example, it allows handle bars of one bicycle to be moved around those of bicycle next to it and then brought back to rest on each other.

Figure 10:
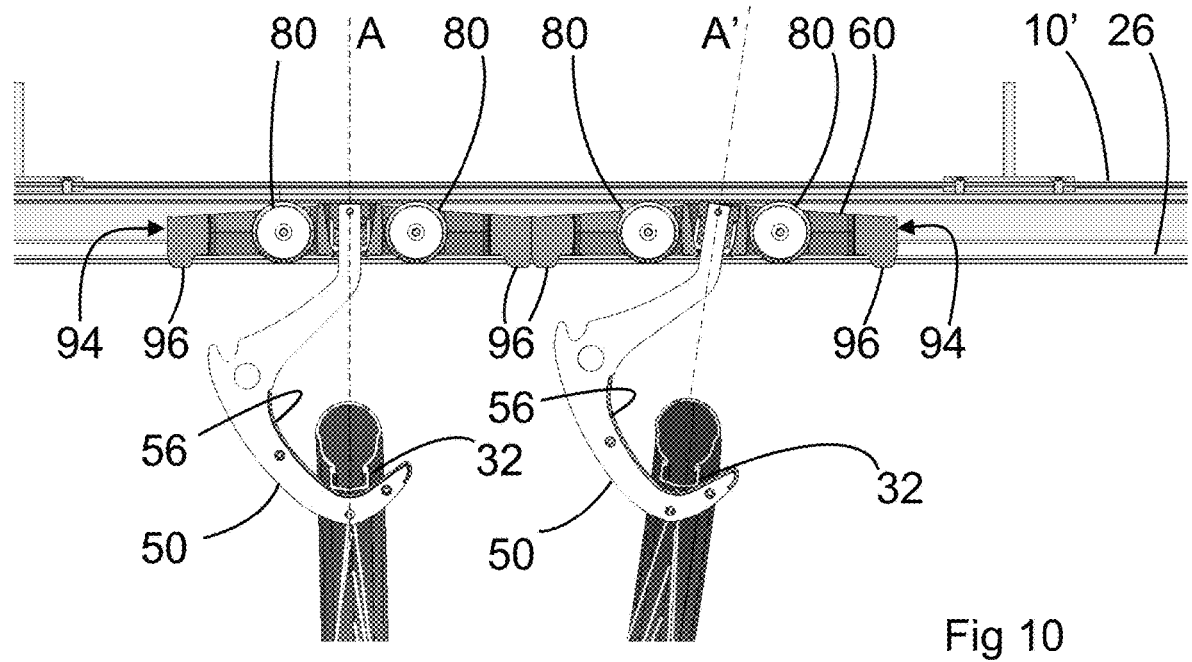
FIG. 10 is a longitudinal cross-section of the system of FIGS. 1 to 3.

As shown in FIG. 10, when multiple carriages 40 are installed in the support rail 10, a minimum spacing between them is maintained by end surfaces 94 of adjacent carriages coming into contact with one another. This minimises the risk that bicycles hung on successive carriages 40 will damage one another through impact or become entangled.

A bicycle 30 will normally be stored on the storage system by moving an unoccupied carriage 40 to a convenient part of the support rail 10, and rotating the carrying hook 44 to an orientation which a user believes will provide easy access. This is done with a downward load applied to the carrying hook 44 to enable it to rotate freely and to enable the carriage to slide freely in the support rail 10. The rim 32 of the front wheel 34 of a bicycle 30 is then hooked over the hook portion 54 of the carrying hook 44, and the bicycle 30 is then carefully lowered until its weight is carried by the carrying hook 44. The rim will come to rest in the tightly curved section of the carrying hook 44, thereby centralising the load of the bicycle 30 and urging the load axis A towards vertical. In this position, the rim 32 will be guarded against damage by the polymer covers 56', 56".

It will be understood that until the weight of the bicycle is lowered onto the carrying hook 44, linear and rotational movement of the carrying hook 44 will be inhibited, as described above. This provides assistance to the user because the hook is likely to be knocked by the wheel 34 during installation of the bicycle 30, and without such inhibition, this would likely cause the carrying hook 44 and the carriage 40 to move unpredictably, making it harder to successfully locate the rim 32 in its proper place, and potentially causing damage to the carriage 40, rail 10 and mounting structure.

Once a bicycle 30 is securely supported on the carrying hook 44, it can be arranged as required on the carrying system. For example, multiple bicycles can be slid along the support rail 10 into a compact arrangement, as shown in FIGS. 1 and 2. A particularly compact arrangement can be achieved if adjacent bicycles are rotated 180° about a vertical axis with respect to one another. The tilting movement of the carrying hook 44 can be used to raise or lower a bicycle 30 during rotation to help its projecting parts pass above or below those of its neighbour. This allows the handlebars and other components of one bicycle 30 to overlap components of an adjacent bicycle, such that the linear space occupied on the support rail 10 by n bicycles is significantly less than n times the width of a single bicycle 30. Alternatively, as shown in FIG. 3, it is possible to slide adjacent bicycles apart and thereby isolate a single bicycle 30 to enable it to be easily removed from the storage system or worked upon.

Additional features of the carriages include a spur formation 100 on the carrying hook 44 that can be used as a supplementary hook for storage of arbitrary articles. A through-hole 102 may be provided through the carrying hook 44 close to its tightly-curved section; this can be used as an attachment point for a cord or a hook which a user can use to help rotate the carrying hook 44 or draw the carriage 40 along the supporting member 10.

In the embodiment of FIG. 1, a high-strength rail 110 is secured to the wall and extends parallel to the support rail 10. This can be used as a secure anchorage to which bicycles 30 stored on the system can be locked, for example using a conventional bicycle lock or a chain or cable locked with a padlock.

An alternative security assembly is shown in FIGS. 15 to 19.

In this embodiment, the security assembly includes an elongate rail 120 of C-shaped cross-section, having a slot 124 extending along its length, and a plurality of connectors 122.

The rail 120 has a flat outer base surface opposite the slot 124. The rail 120 is secured to an anchorage such as wall by a plurality of fasteners 140 that pass through holes 142 in the base of the rail 120. A cover plate 144 is applied to the rail 120 to obscure heads of the fasteners 140 to inhibit their removal. In this embodiment, the cover plate 144 can be installed and removed from the rail 120 only by sliding it through an open end of the rail 120. Once the cover plate 144 is installed, an end closure 146 can be inserted into the rail and secured by a lock 148 to prevent its removal and thereby prevent removal of the fasteners 140.

Figure 19:
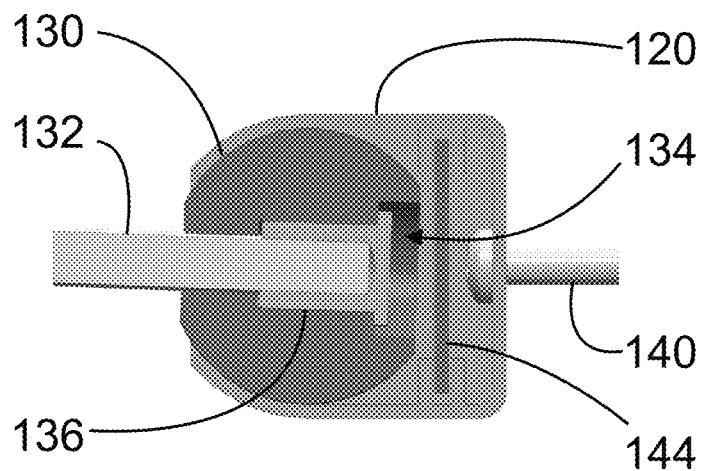
FIG. 19 is a cross-section of the security rail assembly of FIGS. 15 to 18.
Figure 20:
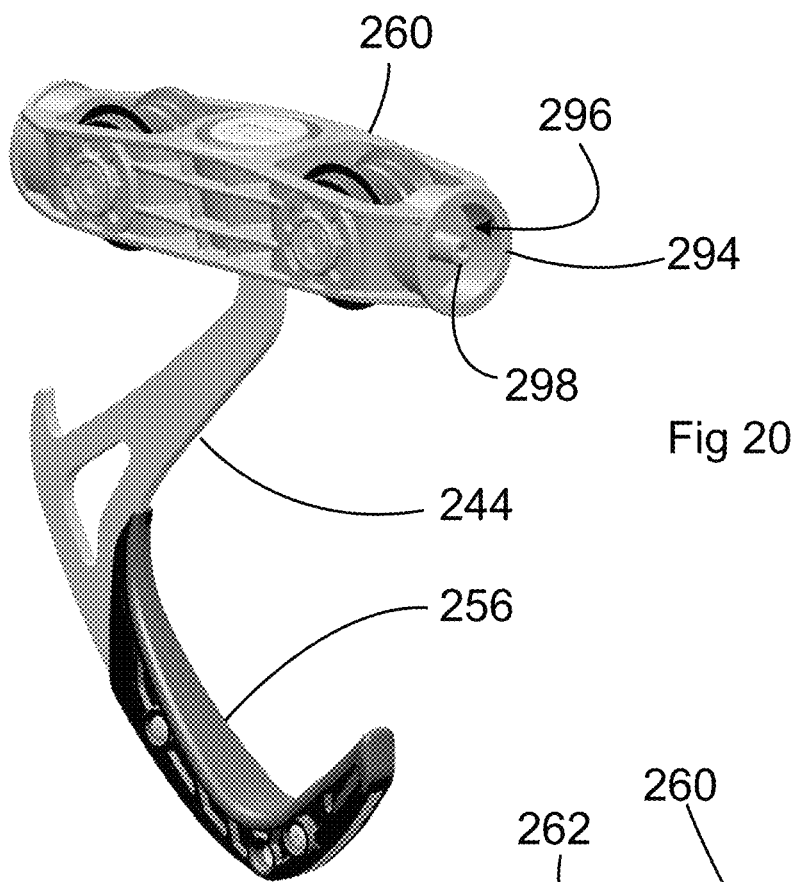
FIG. 20 shows an alternative carriage being a part of a system embodying the invention in a first configuration.
Figure 21:
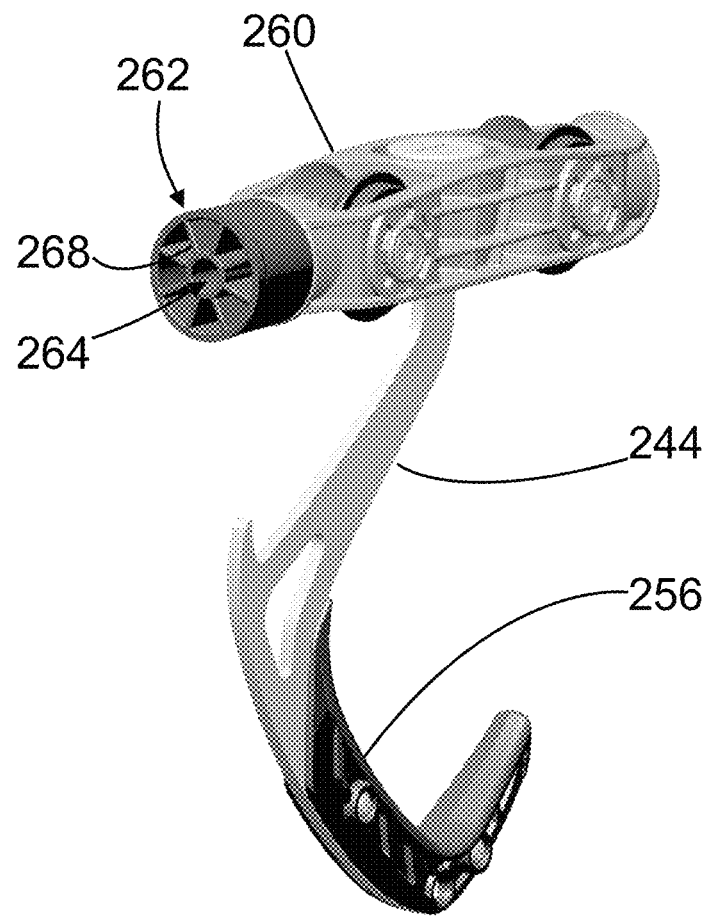
FIG. 21 shows the carriage of FIG. 20 in a second configuration.
Figure 22:
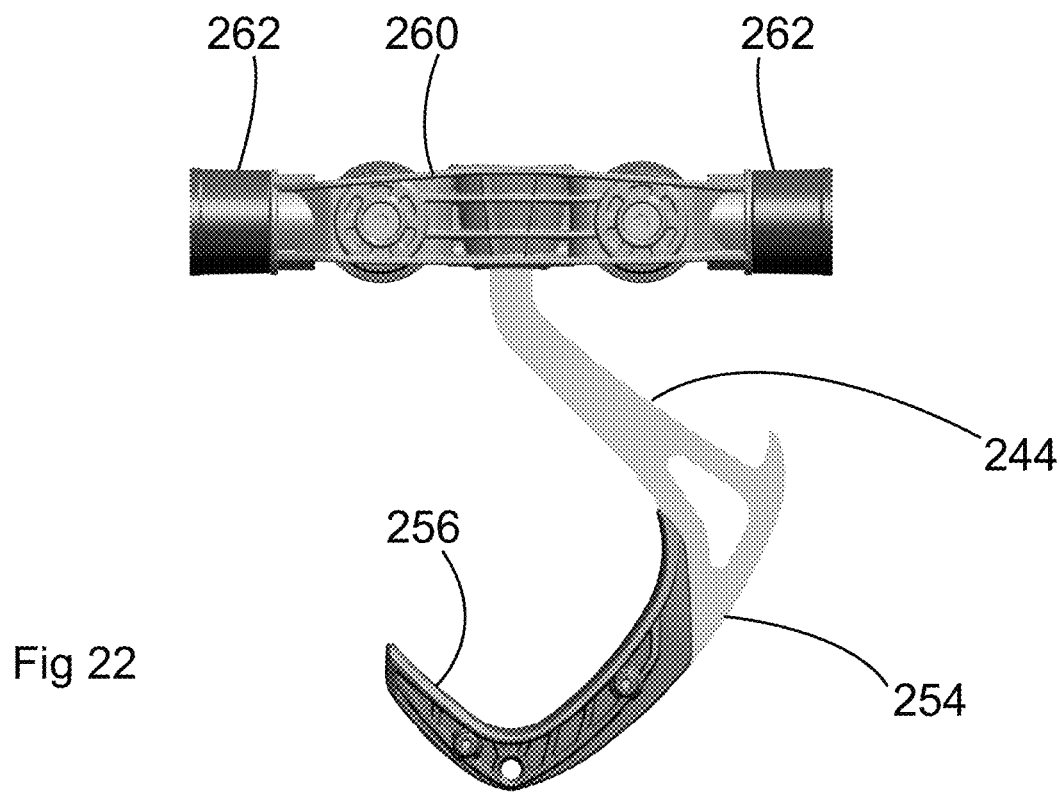
FIG. 22 shows the carriage of FIG. 20 in a third configuration.
Figures 23, 24:
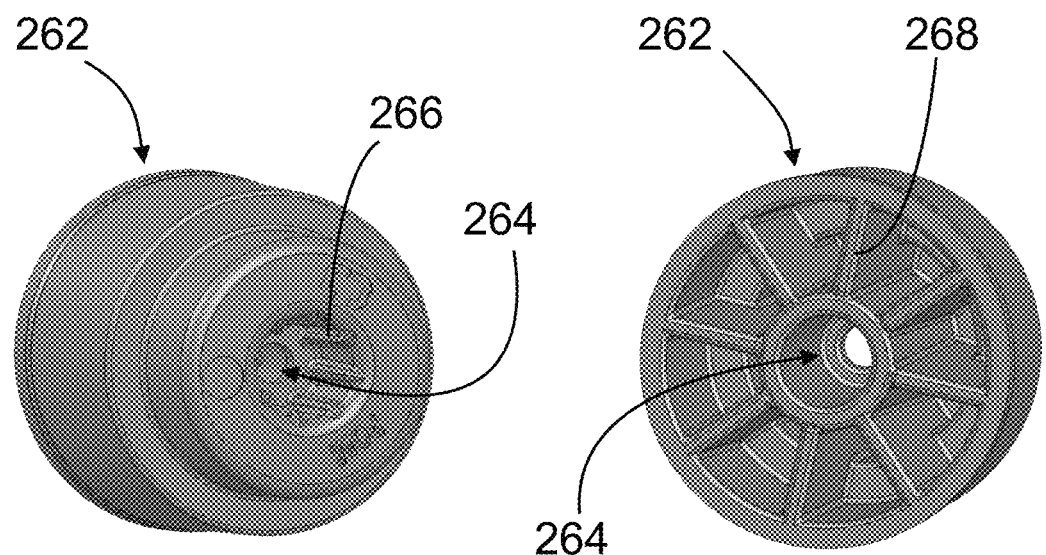
FIGS. 23 and 24 show a spacer being a component of a system embodying the invention.
Figure 25:
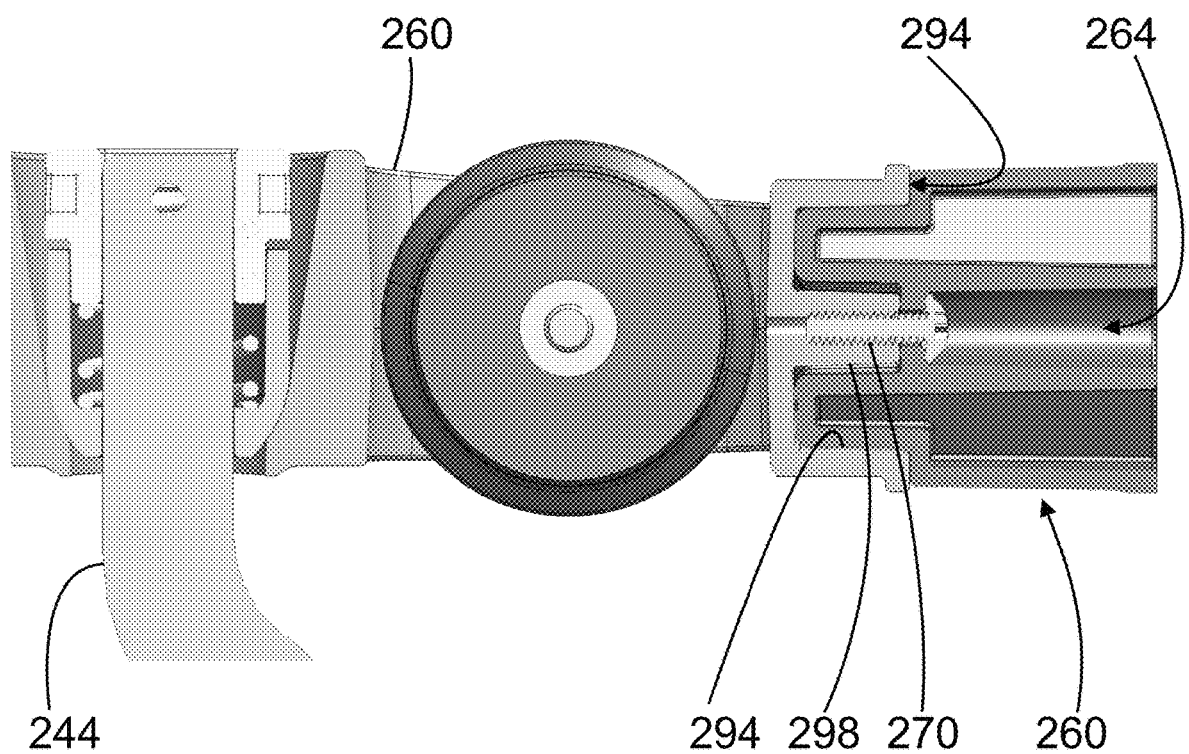
FIG. 25 is a section through a spacer mounted on a carriage.

Each connector 122 comprises an approximately spherical anchor block 130 and a cable 132, an inner end of which is secured within a bore 134 that passes through the anchor block 130. In this example, as shown in FIG. 19, the bore is counterbored and removal of the cable 132 from the bore 134 is prevented by a ferrule 136 applied to the inner end of the cable. The anchor block 130 is dimensioned such that it can pass into the rail 120 from an open end of the rail 120, but it is too large to pass through the slot 124. Therefore, the connectors can slide along the rail 120.

A simple spherical anchor block 130 is chosen in this example as a simple implementation of a blocking device to retain the cable 132 within the rail 120. In contrast to the case with the carriages 40, it is not essential to minimise friction between the anchor block 130 and the rail 120, since in this case, the cable 132 and anchor block 130 will not be under significant load when it is sliding along the rail 120.

Figure 15:
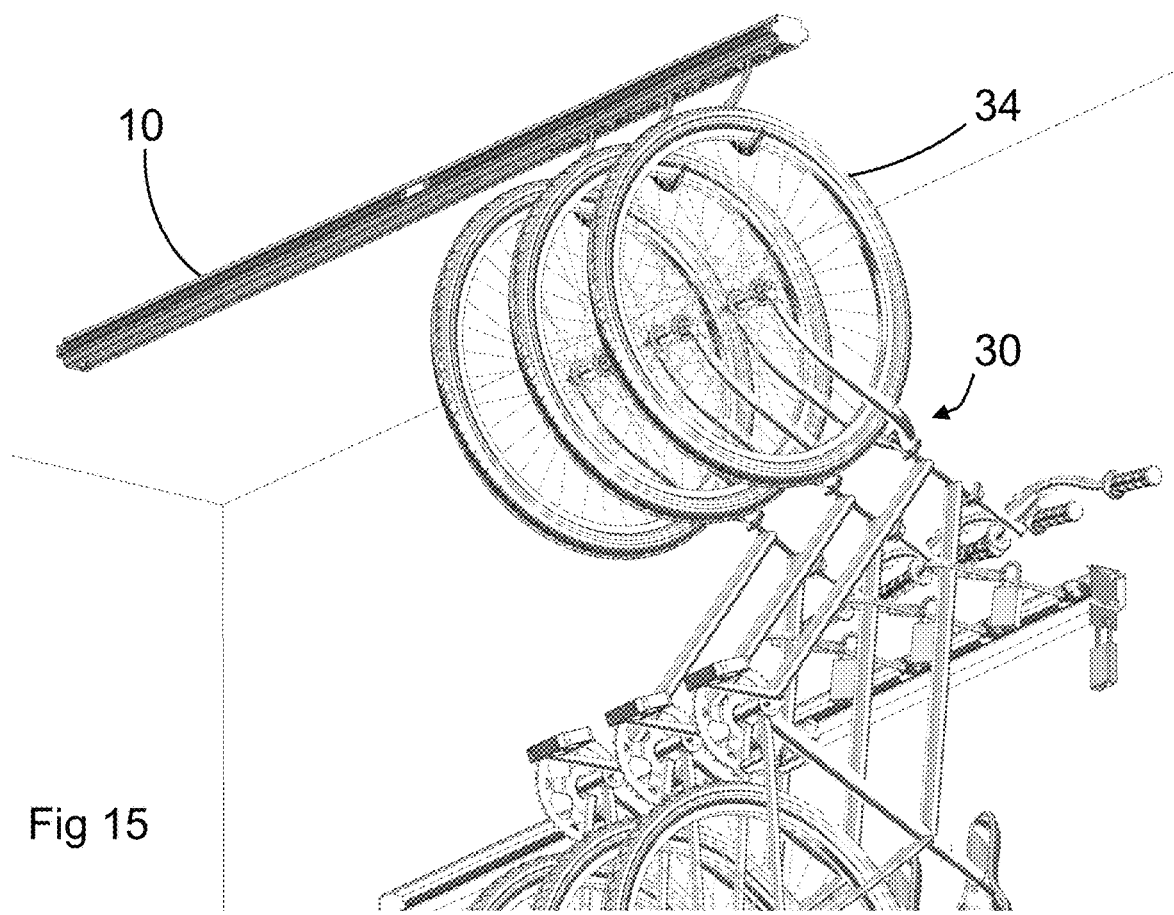
FIG. 15 shows a bicycle storage system embodying the invention on which bicycles are stored, in which the system that includes a security rail assembly.
Figure 16:
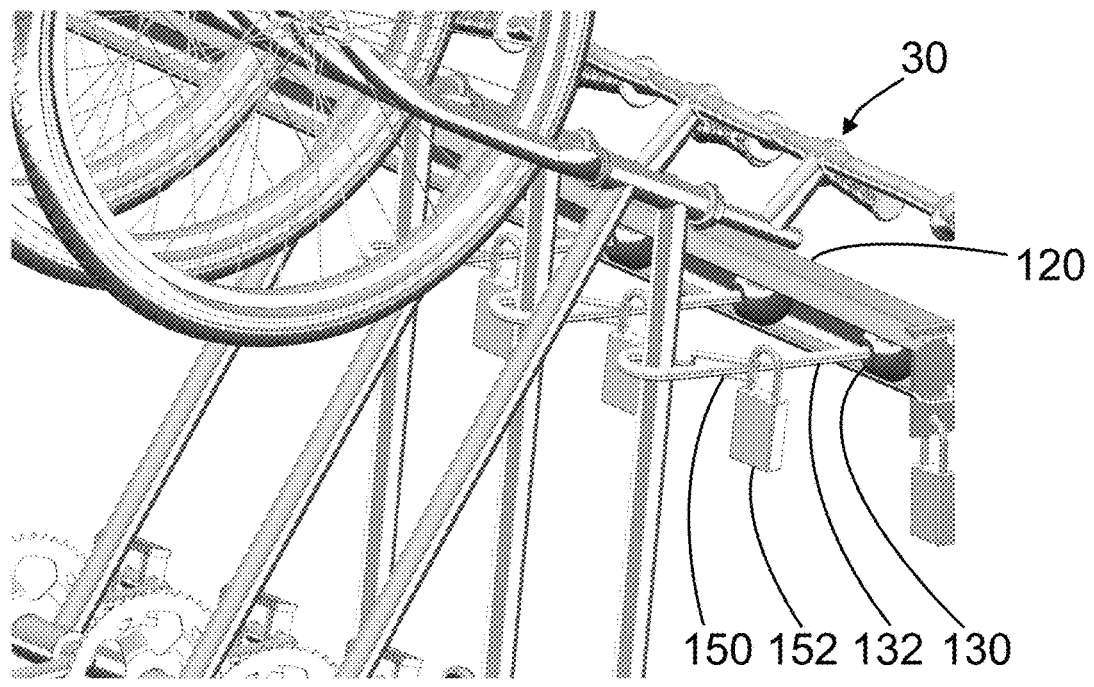
FIG. 16 shows a detail from the storage system of FIG. 15.
Figure 17:
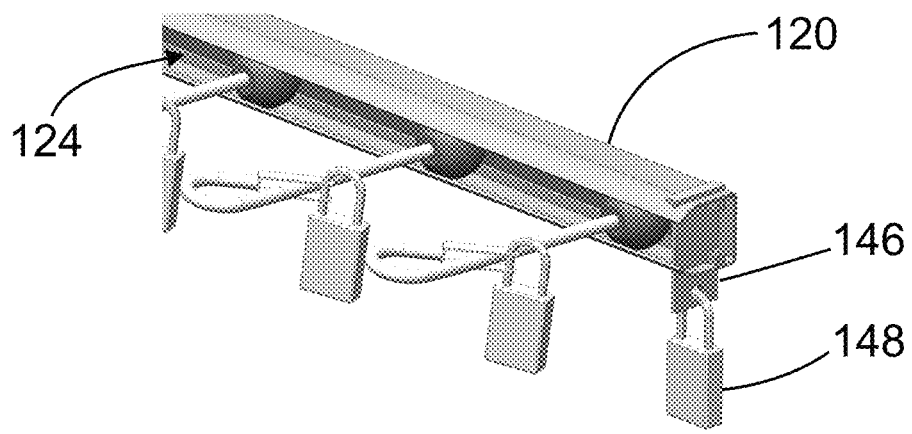
FIG. 17 shows a security rail assembly being a component of the embodiment of FIG. 15.
Figure 18:
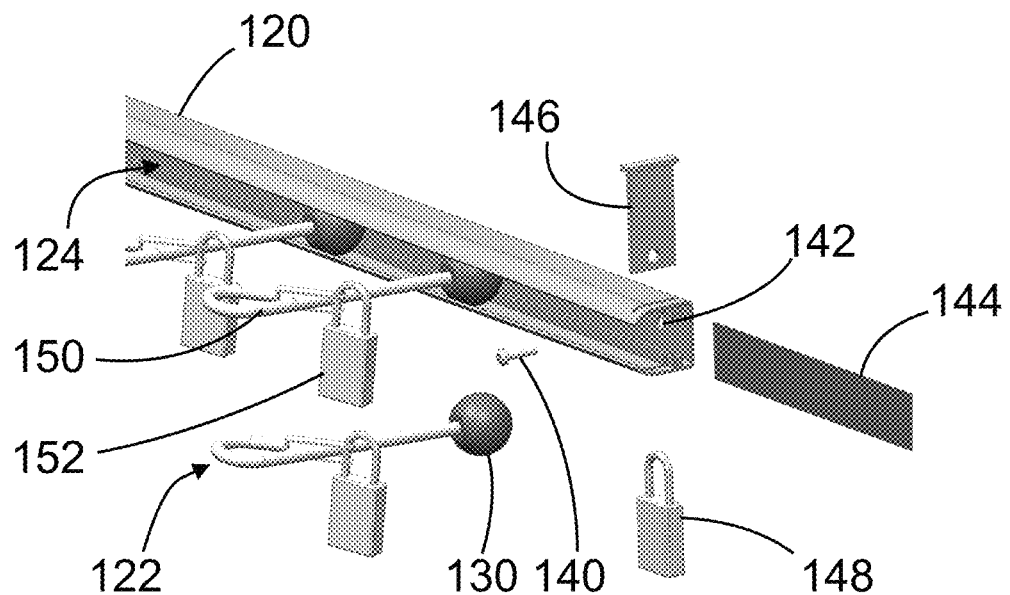
FIG. 18 is an exploded view of the rail of FIG. 15.

The cable 132 has a lockable connector 150 at its outer end. A padlock 152 can be applied to the connector 150 to secure it to the frame of a bicycle 30 carried on the carrying system, as shown in FIGS. 15 and 16. This securely connects the bicycle 30 to the rail 120, preventing its removal, but allows the bicycle 30 freedom to slide along the rail 10, as described above.

A variation on the carriages described above is shown in FIGS. 20 to 23. The carriage of FIGS. 20 to 23 is generally similar to the carriage 40 described above, and only the points of difference will be described here.

The carriages 240 of this embodiment omit the end surfaces 94. Each end of the carriage body 260 is formed as an annular end surface 294 surrounding a recess 296 centred on an axis that extends parallel to the track 10. Centrally of the annular end surface 294 there is a spigot 298 that projects within the recess 296 along the axis of the annular end surface 294, the spigot 298 not projecting beyond the annular end surface 294. The spigot 298 has an axial bore formed in it.

In addition, a system embodying the invention may include one or more spacers 262. Each spacer 262 is formed from a one-piece body formed from moulded plastic material. The body has a circular cross-section that has lesser and greater diameter sections interconnected by a step. The outer surface of each of the lesser and greater diameter sections is close to cylindrical but has a slight taper. An axial through-bore 264 extends through the spacer 262. Within the lesser diameter section, the through-bore 264 has inwardly-projecting splines 266, within the greater diameter section, the through-bore 264 is cylindrical, and within the step, the through-bore 264 has a radially inwardly directed flange. A plurality of radial strengthening ribs 268 extend between the through-bore 264 and the outer surface of the spacer 262.

One spacer 262 can optionally be applied to each end of the carriage body 260. The lesser diameter section is passed into the recess 296 at the end of the carriage body 260 and the spigot 298 enters the through-bore 264. The dimensions of the recess 296, spigot 298 and the external diameter of the lesser diameter section are such that the spacer 262 is a friction fit with the carriage body 260. A self-tapping screw 270 is inserted into the through-bore 264, a shank of the screw 270 being threaded into the bore of the spigot 298, the screw 270 cutting a screw thread in the material of the spigot 298 surrounding the bore as it is driven. A head of the screw 270 bears against the flange within the through-bore 264 to retain the spacer 262 and to clamp the external step of the spacer 262 against the annular end surface 294 of the carriage body 260. The assembled spacer 262 can be seen in more detail in FIG. 24.

Each carriage 240 in a storage system can be used without spacers 262, with one spacer 262 or with two spacers 262. The number of and position of spacers is chosen in dependence upon the space available for installation of the system and on the size of the cycles to be stored. Spacers can be installed to maintain space between carriages 240 that are intended to support cycles with a relatively wide maximum width, typically determined by the width of the front forks at the axle of the front wheel and can be omitted to reduce the space that is maintained between carriages 240 that are intended to support cycles that are relatively narrow. A user may also choose to install spacers in installations in which there is ample length available on the rail 10 to store a required number of cycles. Use of spacers 262 can make such an installation easier to use by maintaining separation between adjacent cycles to reduce the tendency for adjacent cycles to become tangled with one another and improve the usability of the system and reduces the likelihood of a stored bicycle being damaged. In another arrangement, one spacer may be present between each pair of carriages on the rail, but no spacer at the outermost end of the two carriages nearest each opposite end of the rail 10.

A system may be provided with a set of spacers that are all of the same size. Alternatively, spacers of more than one size can be provided to enable a user to select from a range of spacings between adjacent cycles.

Another variation present in the embodiment of FIGS. 20 to 26 is that the polymer covers 56', 56" are replaced with a one-piece cover 256 that has a U-shaped cross-section that can surround the hook portion 254. Note that this one-piece cover 256 could be applied to the carriage 40 of FIG. 4 or other embodiments.

It will also be understood that the carriage construction described includes many optional features, which could be omitted from embodiments of the invention within the scope of the claims to reduce cost or to simplify assembly.

What is claimed is:

1. A system for storing bicycles comprising:
   a. an elongate supporting member;
   b. a carriage that has:
      i. a body that is supported on and that can travel along the supporting member;
      ii. a carrier component that, for use, extends downwardly from the body, from which carrier component a bicycle to be stored can be suspended, the carrier component being capable of rotation with respect to the body about a carrier axis that is approximately vertical;
   c. and wherein:
      i. the carrying component can be displaced vertically with respect to the body between a free position and a braking position, the braking position being above the free position:
      ii. in the free position, the carrying component is free to rotate about the carrier axis and the body is free to travel along the supporting member, and in the braking position, at least one of rotation of the carrier and travel of the body along the supporting member is inhibited;
      iii. the carriage further includes a biasing component that urges the carrying component towards the braking position, and against which the carrying component can be displaced to the free position by weight suspended from the carrying component; and
      iv. the connection between the carrying component and the body is arranged to allow tilting of the carrier axis.

2. The system of claim 1 wherein the carrying component includes a hook formation from which a wheel of a bicycle can be suspended.

3. The system of claim 1 wherein the carrying component has a structural metal core (50) upon which one or more polymer moulding is carried, the or each moulding being positioned where the hook formation is most likely to make contact with parts of a bicycle that is to be suspended on it.

4. The system of claim 1 wherein the carrying component is a solid polymer or solid metal component.

5. The system of claim 1 wherein, in the braking position, a component of the carriage is urged against part of the supporting member.

6. The system of claim 1 wherein the carrying component is biased to urge the carrier axis towards a neutral position in which the carrier axis is close to vertical.

7. The system of claim 1 wherein the elongate supporting member includes two longitudinal, upward-facing supporting surfaces that are spaced apart by a slot.

8. The system of claim 7 wherein the body is supported on the supporting surfaces, and the carrying component projects from the supporting member through the slot.

9. The system of claim 7 wherein the body includes one or more pairs of rollers arranged on two spaced, parallel axes which make contact with the supporting surfaces to support the body and to enable it to move freely along the supporting member.

10. The system of claim 9 wherein the or each roller includes flanges which engage with edges of the supporting surfaces to maintain the carriage centrally within the supporting member during movement of the carriage.

11. The system of claim 1 further including one or more spacers, the or each spacer being secured to a carriage to increase the minimum distance that the carrying component of a carriage to which the spacer has been secured can approach the carrying component of an adjacent carriage on the elongate supporting member.

12. The system of claim 11 wherein each carriage has zero, one or two spacers secured to it.

13. The system of claim 1 further including a security assembly to which a bicycle carried on the system can be securely connected by a lockable chain or cable that is passed around the rail and part of a bicycle carried on the system.

14. The system of claim 13 wherein the security assembly includes an elongate rail.

15. The system of claim 14 which further includes a plurality of connectors, each connector including an anchorage that can slide within the rail and a length of chain or cable that can be secured by locking to a part of a bicycle carried on the system.

16. The system of claim 14 wherein the rail of the security assembly is either a rail separate from that of the elongate supporting member.

17. The system of claim 14 wherein the rail of the security assembly is the elongate supporting member.

18. The system of claim 1 wherein the carrying component further includes a secondary hanging formation from which additional items can be supported.

* * * * *